United States Patent [19]
Choudhury et al.

[11] Patent Number: 5,509,074
[45] Date of Patent: Apr. 16, 1996

[54] METHOD OF PROTECTING ELECTRONICALLY PUBLISHED MATERIALS USING CRYPTOGRAPHIC PROTOCOLS

[75] Inventors: Abhijit K. Choudhury, Scotch Plains; Nicholas F. Maxemchuk, Mountainside; Sanjoy Paul, Scotch Plains; Henning G. Schulzrinne, Sterling, all of N.J.

[73] Assignee: AT&T Corp., Murray Hill, N.J.

[21] Appl. No.: 187,580

[22] Filed: Jan. 27, 1994

[51] Int. Cl.$^6$ .............................. H04L 9/02; H04K 1/00
[52] U.S. Cl. .................... 380/23; 380/21; 380/25
[58] Field of Search ................................. 380/23, 24, 25, 380/21

[56] References Cited

U.S. PATENT DOCUMENTS

| | | | |
|---|---|---|---|
| 4,393,269 | 7/1983 | Konheim et al. | |
| 4,995,082 | 2/1991 | Schnorr | 380/23 |
| 5,077,795 | 12/1991 | Rourke et al. | |
| 5,144,665 | 9/1992 | Takaragi et al. | 380/30 |
| 5,235,642 | 8/1993 | Wobber et al. | 380/25 |

FOREIGN PATENT DOCUMENTS

| | | | |
|---|---|---|---|
| 0465016 | 1/1992 | European Pat. Off. | |

OTHER PUBLICATIONS

L. Harn et al., "A Software Authentication System for Information Integrity", Computers & Security, vol. 11, 1992, pp. 747-752.

R. Laun, "Asymmetric User Authentication", Computers & Security, vol. 11, 1992, pp. 173-183.

B. Struif, "The Use of Chipcards for Electronic Signatures and Encryption", Proceedings Of The VLSI and Computer Peripherals Conference, Hamburg, Germany, May 12, 1989, pp. 4.155-4.158.

M. M. Thiemer et al., "Delegation Through Access Control Programs", 12th International Conference On Distributed System, Yokohama, Japan, Jun. 12, 1992, pp. 529-536.

European Search Report for Application No. EP 95300287.

*Primary Examiner*—Stephen C. Buczinski
*Attorney, Agent, or Firm*—E. Weiss; H. T. Brendzel

[57] ABSTRACT

A method for protecting electronically published documents involves operating a computer system and network for electronic publication of documents, and includes the steps of receiving requests for documents from users having computers with display devices or printers, including with the requests unique user identification for each of the user; authenticating the requests with a copyright server; using the copyright server to direct a document server to act upon proper authentication of each request; using the document server to create uniquely encoded, compressed and encrypted documents for each authenticated request, where the documents have unique encoding corresponding to each of the users, and forwarding the documents to each authenticated request user through the network to corresponding agents of each authenticated request user, with each of the agents being selected from display agents and printer agents; and decrypting and uncompressing the documents at each of the agents and making the documents available for use only in response to receiving correct secret keys provided by the authenticated request user to the agents.

25 Claims, 2 Drawing Sheets

METHOD OF PROTECTING ELECTRONICALLY PUBLISHED MATERIALS USING CRYPTOGRAPHIC PROTOCOLS

BACKGROUND OF THE INVENTION

1. Field of the Invention

The present invention relates to methods of protecting electronically published materials using cryptographic protocols. The invention also utilizes special "agents" of software or hardware to have individual requirements for display devices and/or printers to effect decryption and display or printing of the documents. These methods are directed to inhibiting illicit republication or copying of electronically published documents.

2. Information Disclosure Statement

Cryptography and Identity Verification have been described in the prior art in conjunction with computer transmissions through networks. For example, U.S. Pat. No. 4,393,269 describes a method of incorporating a one-way sequence for transaction and identity verification and U.S. Pat. No. 4,995,082 sets forth a method of identifying subscribers and for generating and verifying electronic signatures in data exchange systems. U.S. Pat. No. 5,144,665 describes a cryptographic communication method and system. Although these patents use cryptographic techniques and key identification and access methods, none teaches or suggests the system claimed herein which involves a combination of techniques to prevent illicit copying and to enhance tracing of original users.

SUMMARY OF THE INVENTION

The present invention is a method of protecting electronically published documents. It involves operating a computer system and network for electronic publication of documents, including the steps of: a.) receiving requests for documents from a plurality of users having computers with display devices or printers, including with the requests unique user identification for each of the plurality of users; b.) authenticating the requests from the plurality of users With a copyright server; c.) using the copyright server to direct a document server to act upon proper authentication of each request; d.) in response to direction from the copyright server, using a document server to create uniquely encoded, compressed and encrypted documents for each authenticated request, the documents having unique encoding corresponding to each of the plurality of users, and forwarding the documents to each authenticated request user through the network to corresponding agents of each authenticated request user, each of the agents being selected from display agents and printer agents; and, e.) decrypting and uncompressing the documents at each of the agents and making the documents available for use only in response to receiving correct secret keys provided by the authenticated request user to the agents. These agents are either pre-installed as software into each of the plurality of users' computers, pre-installed as hardware or firmware into user hardware selected from display devices and printers, or are software programs transmitted at the time of use.

BRIEF DESCRIPTION OF THE DRAWINGS

The present invention will be more fully understood when the specification herein is taken in conjunction with the appended drawings, wherein.

DETAILED DESCRIPTION OF THE PRESENT INVENTION

1. INTRODUCTION

Figure 1:
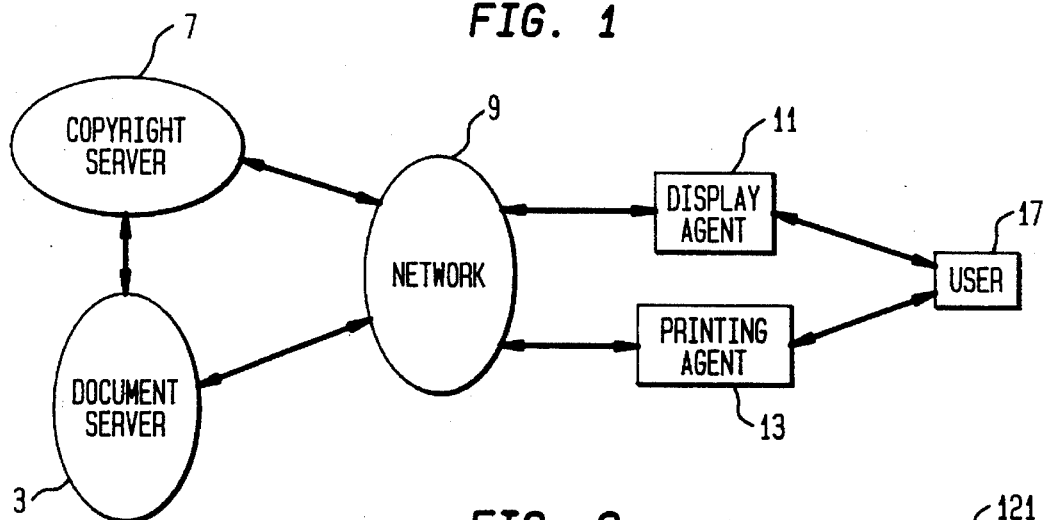
FIG. 1 illustrates a diagram of the overall architecture of the present inventive method of protecting electronically published materials.

The increased use of facsimile has made the electronic transfer of paper documents more accepted. Electronic mail, electronic bulletin boards and large networks systems make it possible to distribute electronic information to large groups. Moreover, the proliferation of personal computers and workstations, the excellent quality of desktop printers and the plummeting cost of storage devices for large volumes of electronic data have made it technologically feasible to display, print and store documents electronically. All of these developments have made electronic publishing a reality. The electronic distribution of information is faster, less expensive, and requires less effort than making paper copies and transporting them. Other factors that favor electronic information distribution include the ability to use a computer to search for specific information, and the ability to more easily customize what is being distributed to the recipients. Electronic newspapers, magazines and journals are poised to supplement, and eventually replace the current paper distribution networks.

The advantages offered by electronic distributions are also among the primary technical impediments to the acceptance of electronic documents as a replacement for paper versions. One of the major technical and economic challenges faced by electronic publishing is that of preventing individuals from easily copying and illegally distributing electronic documents. It is easier for a person who receives an electronic document to forward it to a large group than it is for a person who receives a paper copy of the same document. In addition, electronic copies are more like the originals than paper copies. When an electronic copy is made, the original owner and the recipient have identical entities. Bootlegged copies of electronic documents are likely to result in major losses in revenue.

Thus, the present invention is directed to the use of cryptographic protocols to discourage or prevent the distribution of illicit electronic copies via any available distribution and presentation techniques, typically, using printers and display devices. The term "printer" as used herein is intended for broad interpretation so as to include mechanical and laser printers, facsimile machines, copiers, plotters, etc. Likewise, "display devices" should be broadly taken to include any device that displays documents in any form other than printed form. The present invention involves two alternative approaches to making electronic document distribution secure. In each case, the publisher encrypts the document with a secret key. In the first method, described in Section 3.1, special purpose hardware or firmware in the printers and display devices decrypts the document. The user only has access to the encrypted version of the document, which is not useful to anyone else.

In the second method, described in Section 3.2, the document is decrypted in software in the recipient's computer. Special purpose hardware or firmware is not required, but the bitmap is available to the user and can be distributed. In this strategy, the publisher encrypts the document, transmits the document in a page description language (hereinafter "PDL"), such as the well known PostScript language, and the decryption program produces a bitmap. The publisher can easily modify the inter-line or inter-word spacings in the PDL version of the document to make each copy of the document unique. There are two elements of this strategy that discourages the distribution of illegal copies:

1. Illegal copies, that are in violation of the copyright laws, can be traced back to the original owner.

2. The bitmap, or an easily compressed version of the bitmap, has more bits than the PDL version, so that it costs an illegal distributor more to transmit the document than it does the publisher.

This strategy also reduces the transmission cost to the publisher for unique document identification. The unique identifiers are easily removed from the PDL version, but not from the bitmap. Encryption makes it possible for the publisher to transmit the PDL version without giving the user access to it.

The cost of a processor that is capable of performing decryption is not large with respect to cost of printers and displays. Therefore, one should suspect that the first strategy will probably be used once electronic publishing catches on. However, until electronic publishing is used on a widespread basis, it is unlikely that output devices with internal decryption capabilities will exist. The second strategy may provide an acceptable means to achieve the purpose of the invention before specialty hardware is widely accepted. Although the second strategy just discourages illegal copying and does not prevent it, it makes a wider class of electronic publications possible. Once a reasonable set of electronic publications is available, special purpose hardware should become reasonable.

2. ARCHITECTURE

The basic architecture for the distribution of electronic documents according to the present invention is shown in FIG. 1. Here, Document Server 3 (trusted by a publisher) provides encoded, encrypted and compressed document to User 17. Copyright Server 7 authenticates requests from User 17 for obtaining documents, and this is also trusted by a publisher. Display Agent 11 includes software trusted by publisher which decrypts and displays the document obtained from Document Server 3. Printing Agent 13 includes software trusted by a publisher which decrypts and prints the document obtained from document server. Either Display Agent 11 or Printing Agent 13, or both, or a plurality of these may be available to a user.

Network 9 transports document requests and documents to and from the other components. User 17 generates a signed request for document and will need to provide a secret key to display or print a document.

3. PROPOSED EMBODIMENTS

Two generally separate embodiments are proposed for making electronic document distribution secure. The first approach requires special purpose hardware for displaying or printing the electronic document, and may be more appropriate when the hardware technology progresses to the stage where such special purpose devices are inexpensive and easily available. The second approach utilizes display devices and printers that are available now. However, both protocols use the same basic architecture and method discussed before.

3.1 Example 1

Figure 2:
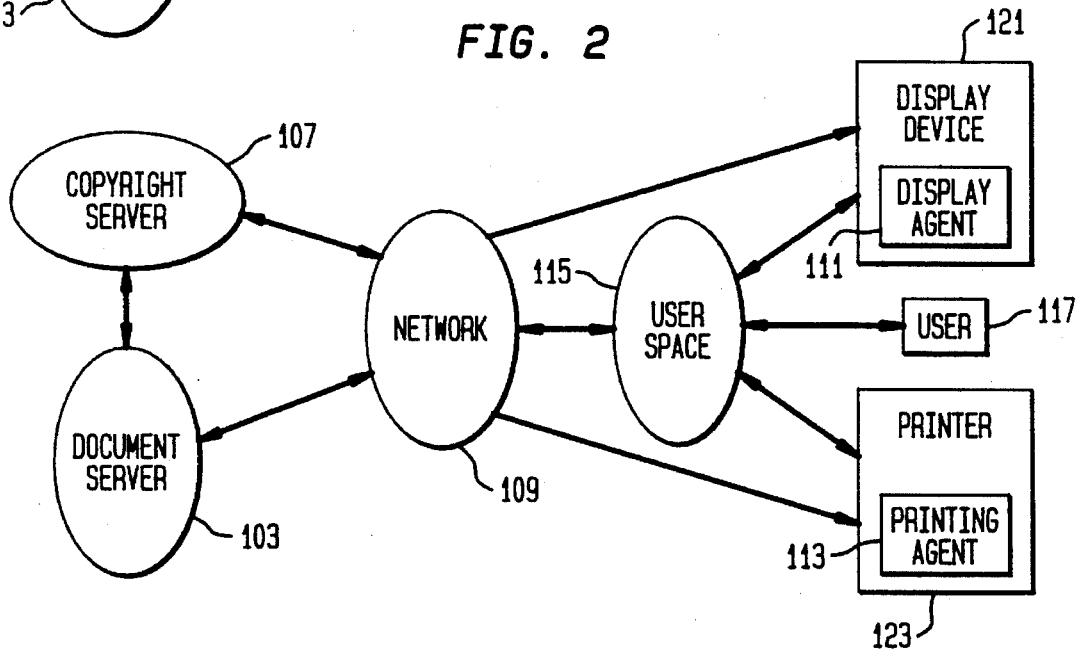
FIG. 2 illustrates a specific architecture for a present inventive method using specialty hardware.

This first embodiment, shown in FIG. 2, involves a straightforward application of cryptographic techniques to send encrypted information between a Document Server 103, which is trusted by the publisher, and a trusted Display Agent 111 and/or a trusted Printing Agent 113. The Display Agent 111 or Printing Agent 113, containing the secret key that is shared with the Copyright Server 107, resides within the special purpose display device 121 or printer 123 designed for electronic publishing. Thus, Agent needs the necessary software, hardware, and/or firmware to receive and to decrypt the documents only in response to specified inputs. These devices must be sealed so that it is not easy to make copies of the hardware or firmware that contains the secret key or keys.

When the User 117 wants to view or print a document, he must make a request for a document via network 109 by using a unique identification, such as a credit card number, or other relatively valuable number that a user would not be willing to give away to someone else for illicit purposes. The Copyright Server 107 will authenticate the User's request and then the Document Server 103 sends out an encrypted copy directly to the display device 121 or printer 123 available to User Space 115. This document is encrypted so that only a specific printer or display device can decrypt it. Since only an encrypted document is seen on the network, it is not possible for a malicious user to get at the document. Once the displayer or printer receives the encrypted document, the device decrypts it and displays or prints it. As another feature for some embodiments of the present invention, in order for the User to activate display or print functions, the User may be required to input to the Display or Print Agent, a unique identification number such as was used to make the initial request. In these embodiments, it is possible to prevent the distribution of illicit copies. The algorithm used in this method to encrypt information could be any standard algorithm, such as DES (a known private key system-Digital Encryption Standard). However, this approach requires special purpose displays and printers for electronic publishing, and so may be more appropriate when there is a sufficient set of services and users to justify such special purpose hardware. Such hardware is well within the skill of the artisan, but the economics based on low numbers of users would make it difficult to succeed commercially until widespread electronic publishing occurred.

3.2 Example 2

In this second approach, cryptographic techniques that do not require special purpose hardware are used. The problem that is encountered when dealing with conventional displays and printers is that the information that is displayed or printed exists in the recipient's computer. The recipient can capture the information that will be displayed, and can distribute that information to as many other printers and displays as desired. Instead of trying to prevent the recipient from redistributing information, the objective will be to discourage the distribution of bootlegged copies.

In an earlier work, it was shown that the ability to custom tailor copies of the journal for each recipient could also be used to identify the original owner of a document. Information that identifies the original owner is encoded into the space between the lines and words of text or as part of unique shifting or changes in word, line and character features. The intention of the mechanism is to discourage individuals from distributing journals in violation of the copyright laws.

A protocol is now described by which documents can be distributed electronically to the subscribers and the subscribers can be discouraged from distributing the documents electronically to non-subscribers. The algorithm used to encrypt information could be any standard algorithm, like RSA (an algorithm public key system which is well known— Rivest-Shamir-Adleman Algorithm). The present invention involves the novel application of cryptographic techniques to discourage the illegal distribution of electronic documents. Since this example does not require special purpose hardware, it is believed that this technique will help demonstrate the feasibility of electronic document distribution, and encourage new services in this area. Once there are enough users, special purpose hardware will be justified, and a simpler method like Example 1 may then be used successfully from a commercial standpoint.

3.2.1 Overview of the Protocol

The protocol is discussed in conjunction with FIG. 3 and works in the following phases:

1. Request Generation: user u requests a document by sending a signed message to Copyright Server 207 via Network 209, including document details.
2. Document Transmission: (a) the Copyright Server 207 verifies the request and if it is valid, it arranges to send the document from the Document Server 203, (b) Document Server 203 sends the encrypted and compressed PDL version of the document to the User 217. The document sent to user u is also encoded or finger-printed with some information unique to u. (Alternatively, this encoding or finger-printing of the document may be performed at the user end, e.g. by the user's printer or display device.) The Copyright Server 207 may also send the Display Agent 211 and the Printing Agent 213 to the User Space 215 at this stage.
3. Document Viewing or Printing: upon receiving a request to display (or print) the document, the Display Agent 211 or the Printing Agent 213 prompts the User 217 to type in his/her secret key, $S_u$, upon receiving which the agent decrypts and decompresses the received PDL document, generates a bitmap and sends it to the display device 221 or printer 223.

Details of the Protocol

Hereinafter, d, c, and u refer to the Document Server, the Copyright Server and the User, respectively. It is assumed that each user u has a pair of public and secret keys $P_u$ and $S_u$. In addition, the Document/Copyright Server will have a key $M_x$ which will be used to encrypt the transmitted documents and which will be embedded in the Display and Printing Agents so that they can decrypt the received documents.

Request Generation:

$$m_1(u,c) = [u, \text{document info}, ES_u [u, \text{document info}]]$$

This is a signed message $m_1$ from user u to Copyright Server c requesting a document. Document information (like journal, title of article, authors, etc.) is sent together with the user ID, u. The user ID u helps the Copyright Server to look up the directory to find $P_u$, the public key of the user. In addition, the user signs the clear text with his/her secret key, $S_u$. Encryption E with $S_u$ is needed to prevent malicious users pretending to be who they are not, to prevent any tampering of the document request. Document Transmission: Copyright Server receives $m_1(u,c)$, looks up the directory for $P_u$, decrypts $ES_u$ [u, [document info]], and compares the clear text against the decrypted text. If they are identical, it sends a message $m_3$ to the Document Server to send the document $m_3(d,u)$ to user. The Copyright Server also sends the Display Agent and the Printing Agent to the user as message $m_2(c,u)$ at this stage. The Display Agent and the Printing Agent have embedded in them a key $\Phi$, which is $EP_u[M_x]$, i.e., the key, $M_x$ encrypted with the public key $P_u$ of the user.

$m_2(c,u) = [[\text{Display Agent}],[\text{Printing Agent}]]$ $m_3(d,u) = EM_x [[\text{Compressed Documents}]]$ The Display and Printing Agents are not encrypted because nobody other than a specific user u can use them for decrypting an encrypted document.

The document sent to the user is a compressed PDL version that is encrypted with $M_x$. Even if user u distributed the Display or Printing Agents, together with the encrypted document, it would be of no use unless the secret key $S_u$ was divulged as well because the key $M_x$, with which the document is encrypted, cannot be generated from $\Phi$ without $S_u$. Document Viewing or Printing: To view (or print) a document, the Display (Printing) Agent first prompts the user for his secret key $S_u$. The embedded key $\Phi$ is decrypted with $S_u$ to obtain the key $M_x$ with which the compressed document is decrypted. This is further decompressed, converted to a bitmap and sent to the screen (printer).

The above protocol will allow a legitimate user to request a document and view it on his/her terminal/workstation as many times as desired. However, it will prevent an illegal user from doing the same even if he/she happens to copy the Display/Printing Agents and the encrypted document from the legal user. The underlying assumption in the protocol is that the user's secret key, $S_u$, is too important for the user to give up. If the secret key is the same as used for electronic mail signatures, system login or credit-card purchases, there is a strong disincentive to giving it away to others.

Additional precautions can be built in by somehow restricting the document to be displayed or printed on some pre-registered hardware. But this is not desirable as it will tie down the user to specific machines and restrict his/her mobility.

Once the document has been decrypted and decompressed, it is available as a bitmap in the user's computer. Recall that (1) the bitmap is finger-printed with information specific to user, u. and (2) the bitmap is much larger than the compressed PDL version of document transmitted by the publisher. So, even if the user is willing to capture and transmit the much larger bitmap file, the user can only do it at the risk of incriminating himself, unless the user makes the significantly larger effort required to erase the fingerprint from the bitmap.

3.2.2. Use-Once Programs as a Key-Hiding Mechanism

As pointed out in Example 2, critical programs are required to be executed under the user control to display and print documents. For example, there is a display or printing agent which is a trusted program with the publisher's magic key $M_x$ hidden in it. During execution, the display (printing) agent picks up $ES_u[M_x]$ from the right location, decrypts it using $S_u$ provided by the user u and used it to decrypt the encrypted document. Note that if the user can discover $M_x$ by analyzing the code for display (printing) agent and stopping the execution at the right point, then the whole purpose of sending encrypted documents is defeated. Since this kind of reverse engineering cannot be completely prevented, the payoff of reverse engineering is reduced by sending trusted programs that do the same job but look different for each user. If documents and Display/Printing agents are distributed through networks, it is relatively easy to generate a unique copy for each recipient.

The use of use-once programs also has the advantage that the origin of program can be readily traced. Modifying a binary executable to create another working program requires a deep understanding of the program structure and any self-protection mechanisms (checksums) a program may employ. Compared to protecting printed articles, identifying programs is relatively easy.

For example, four different levels of security may be used:
1. all users have the same Display/Printing Agents containing an algorithm that derives a key from a system identifier;
2. the Display/Printing Agent are sent once (or at some time interval but unique for each user);
3. the Display/Printing Agents are the same for each document and are transmitted with each document;
4. the Display/Printing Agents are unique and are transmitted with each document.

A number of techniques can be used for creating unique, but equivalent programs automatically at the compile or link stage. For example:

(1) the linker can reorder text and data segments;
(b 2) the compiler can be instructed to randomly optimize certain sections of code;
(3) sections of the code can be replaced by functionally equivalent, different algorithms and,
(4) the compiler can change the register allocation sequence.

Note that more elaborate arrangements for protecting RAM access patterns and contents may be added, at the cost of reduced execution efficiency. In addition, standard techniques of hiding tell-tale code sequences (such as replacing system calls to constant addresses by computed calls) should be used.

Figure 3:
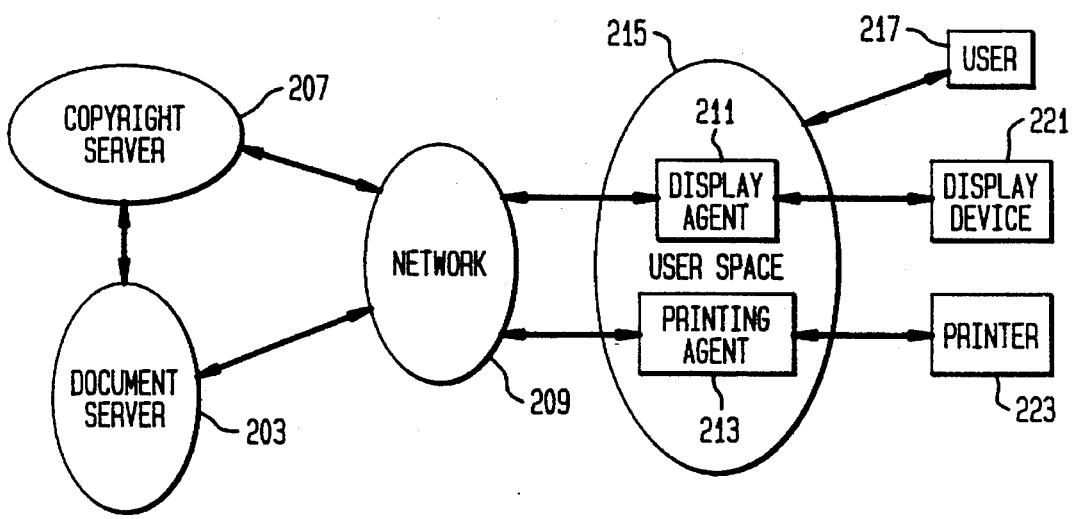
FIG. 3 illustrates a specific architecture for a present inventive method using specialty software.
Figure 4:
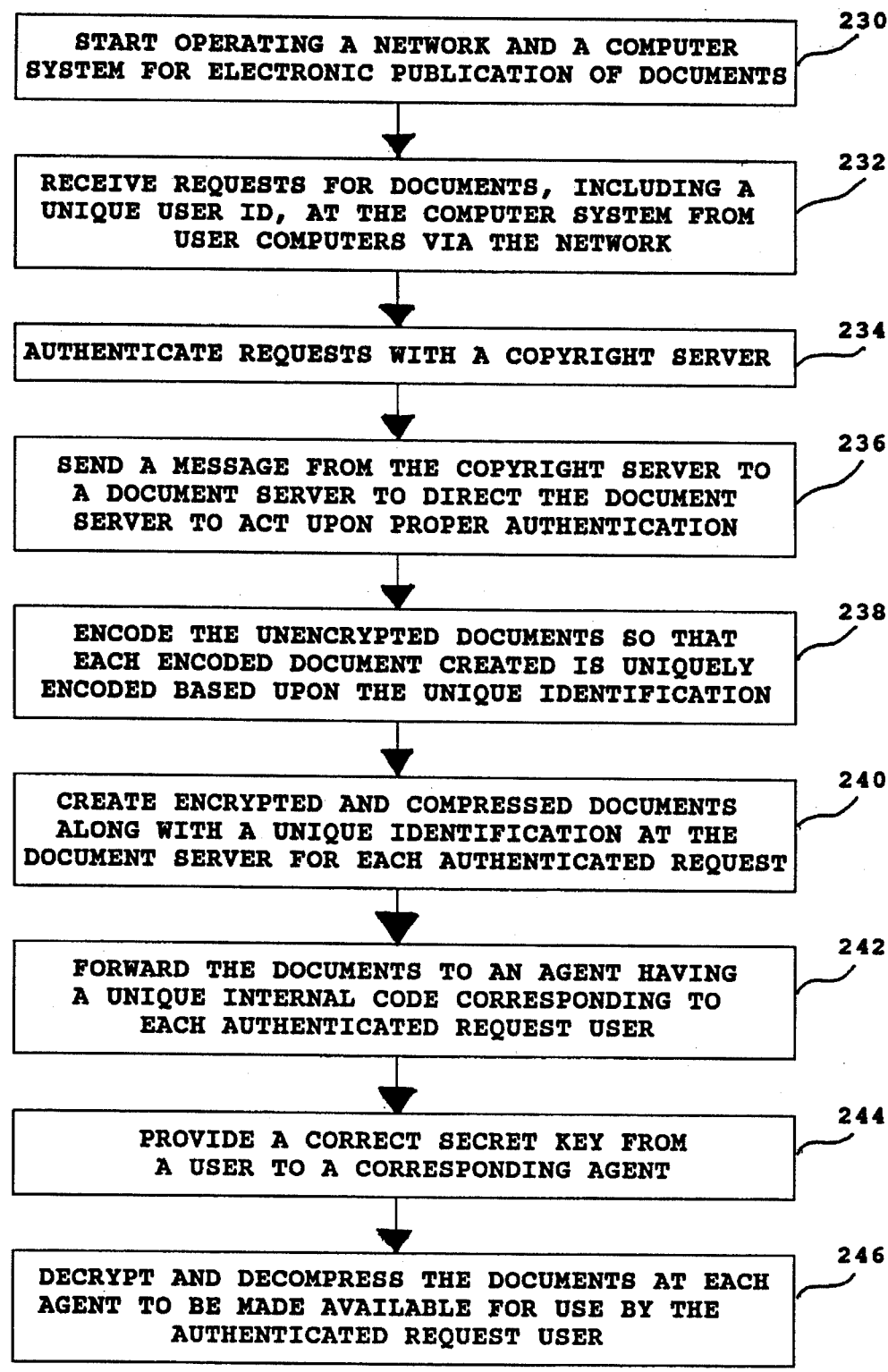
FIG. 4 illustrates a flowchart of the present inventive method.

As shown in the flowchart of FIG. 4 in conjunction with FIGS. 1–3, the present inventive method described in greater detail above generally includes the steps of starting to operate a network and a computer system for electronic publication of documents in step 230; receiving requests for documents, including a unique user ID, at the computer system from user computers via the network in step 232; authenticating requests with a copyright server in step 234; sending a message from the copyright server to a document server to direct the document server to act upon proper authentication in step 236; encoding an unencrypted requested document so that each encoded document created is uniquely encoded based upon the unique identification in step 238; creating encrypted and compressed documents from the encoded document along with a unique identification at the document server for each authenticated request in step 240; forwarding the documents to an agent having a unique internal code corresponding to each authenticated request user in step 242; providing a correct secret key from a user to a corresponding agent in step 244; and decrypting and decompressing the documents at each agent to be made available for use by the authenticated request user in step 246.

Obviously, numerous modifications and variations of the present invention are possible in light of the above teachings. It is therefore understood that within the scope of the appended claims, the invention may be practiced otherwise than as specifically described herein.

What is claimed is:

1. A method of protecting electronically published documents, which comprises the step of:

operating a computer system, including a copyright server and a document server connected thereto, and a network for electronic publication of documents stored in the document server, and including therein the steps of:

a.) receiving requests for documents from a plurality of users having computers with display devices or printers, said computers being connected by said network to said computer system, said requests including unique user identification for each of said plurality of users;

b.) authenticating said requests from said plurality of users with the copyright server;

c.) using said copyright server to direct the document server to act upon proper authentication of each request;

d.) in response to direction from said copyright server, using the document server to create encrypted documents from an encoded document along with a unique identification for each authenticated request and forwarding said documents to each authenticated request user through said network to corresponding agents located at each authenticated request user, each of said agents being selected from display agents and printer agents;

e.) encoding a requested document as an encoded document using the document server so that each encoded document created is uniquely encoded based upon said unique identification; and, f.) decrypting said documents at each of said agents and making said documents available for use only in response to receiving correct secret keys provided by said authenticated request user to said agents.

2. The method of claim 1 wherein said document server also compresses said documents and said agents uncompress said documents in response to receiving a correct secret key provided by said authenticated request user.

3. The method of claim 1 wherein said agents are pre-installed as software into each of said plurality of users' computers.

4. The method of claim 1 wherein said agents are software programs which are transmitted to said plurality of users only after requests have been authenticated.

5. The method of claim 1 wherein said agents are pre-installed as computerware selected from hardware and firmware into user hardware selected from display devices and printers.

6. The method of claim 1 wherein each of said agents has a unique internal code corresponding to its user.

7. The method of claim 1 wherein each of said agents is capable of decrypting only a single, uniquely encoded version of documents published.

8. The method of claim 3 wherein each of said agents is capable of decrypting only a single, uniquely encoded version of documents published.

9. The method of claim 5 wherein each of said agents is capable of decrypting only a single, uniquely encoded version of documents published.

10. The method of claim 1 wherein said plurality of users have the same agents that uses an algorithm that derives a key from a system identifier to allow decryption and display in subsequent response to a unique, correct user secret key.

11. The method of claim 1 wherein said plurality of users receive agents with each document forwarded, all such agents being the same for a given document and different from publication to publication.

12. The method of claim 1 wherein said plurality of users receive agents with each document forwarded, all such agents being different from one another.

13. The method of claim 1 wherein said documents are uniquely encoded by the document server.

14. The method of claim 1 wherein said documents are uniquely encoded after being forwarded to each authenticated request user.

15. A method of protecting electronically published documents, which comprises the step of:

operating a computer system, including a copyright server and a document server connected thereto, and a network for electronic publication of documents stored in the document server and including therein, the steps of:

a.) receiving requests for documents from a plurality of users having computers with display devices or printers, said computers being connected by said network to said computer system, said requests including unique user identification for each of said plurality of users;

b.) authenticating said requests from said plurality of users with the copyright server;

c.) using said copyright server to direct the document server to act upon proper authentication of each request;

d.) in response to direction from said copyright server, using the document server to create compressed and encrypted documents from encoded documents for each authenticated request, and forwarding said documents to each authenticated request user through said network to corresponding agents located at each authenticated request user, each of said agents being selected from display agents and printer agents;

e.) encoding a requested document as an encoded document using the document server so that each encoded document created is uniquely encoded with encoding corresponding to each of said plurality of users; and, f.) decrypting and uncompressing said documents at each of said agents and making said documents available for use only in response to receiving correct secret keys provided by said authenticated request user to said agents.

16. The method of claim 15 wherein said agents are pre-installed as software into each of said plurality of users' computers.

17. The method of claim 15 wherein said agents are software programs which are transmitted to said plurality of users only after requests have been authenticated.

18. The method of claim 15 wherein said agents are pre-installed as computerware selected from hardware and firmware, into user hardware selected from display devices and printers.

19. The method of claim 15 wherein each of said agents has a unique internal code corresponding to its user.

20. The method of claim 15 wherein each of said agents is capable of decrypting only a single, uniquely encoded version of documents published.

21. The method of claim 15 wherein said agents are pre-installed as firmware into user hardware selected from display devices and printers, and wherein each of said agents is capable of decrypting only a single, uniquely encoded version of documents published.

22. The method of claim 15 wherein said documents are uniquely encoded by the document server.

23. The method of claim 15 wherein said documents are uniquely encoded after being forwarded to each authenticated request user.

24. An apparatus comprising:

a plurality of user computers associated with a respective users for transmitting a request for a document, with each request including unique user identification;

a copyright server operatively connected to the plurality of user computers for storing a directory of identifying information of each respective user, for receiving and authenticating a request from an authenticated request user, and for generating a message upon authentication of the request;

a document server for storing a plurality of documents in electronic form, for encoding a requested document to be uniquely encoded based upon a unique request identification, for encrypting a requested document along with a unique request identification for each authenticated request, and for forwarding the encrypted documents to each authenticated request user via a corresponding agent; and a plurality of agents, each agent associated with a user computer for decrypting the encrypted document and, responsive to a correct secret key from an authenticated request user, for providing the decrypted document to the authenticated request user.

25. The apparatus of claim 24 further comprising:

a network for operatively connecting the plurality of user computers to the copyright server and the document server.

* * * * *